UNITED STATES PATENT OFFICE.

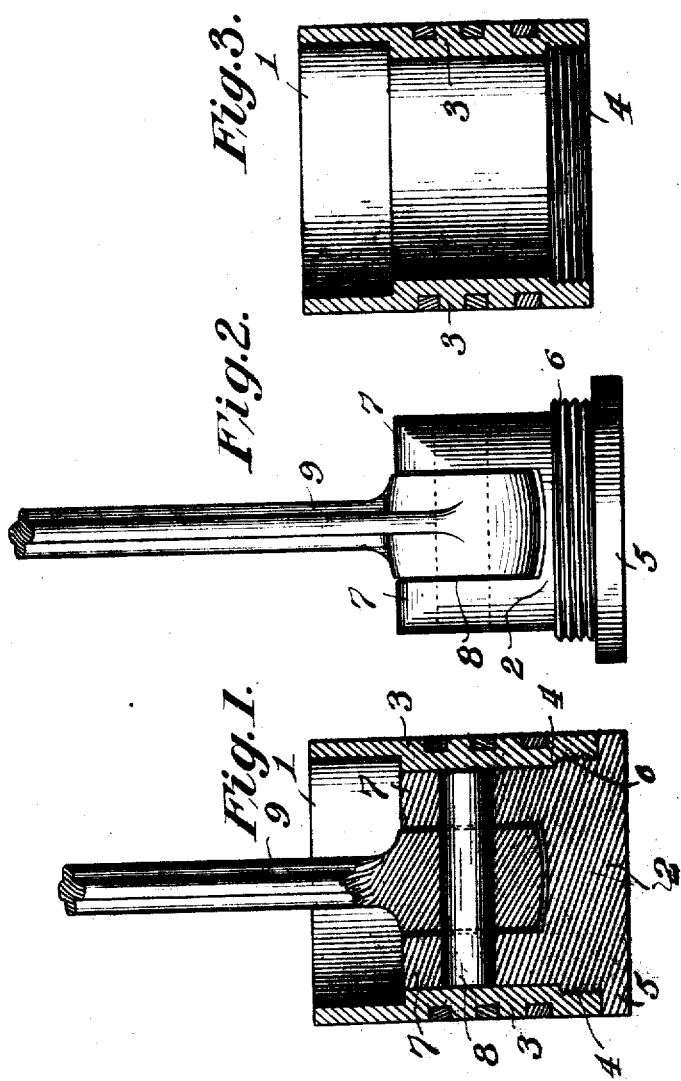

JOHN BITTNER, OF NEWCASTLE, INDIANA.

PISTON FOR EXPLOSIVE-ENGINES.

1,017,498. Specification of Letters Patent. Patented Feb. 13, 1912.

Application filed February 7, 1911. Serial No. 607,101.

*To all whom it may concern:*

Be it known that I, JOHN BITTNER, a citizen of the United States, residing at Newcastle, in the county of Henry and State of Indiana, have invented new and useful Improvements in Pistons for Explosive-Engines, of which the following is a specification.

This invention provides simple, effective and secure connecting means between the piston of an explosive engine and the rod connecting said piston to the crank shaft, the connection being such as to prevent possible injury to the walls of the cylinder.

In accordance with this invention the piston comprises two parts, a body and a head which are connected in any substantial manner, preferably by means of a screwthread joint, the head having ears or webs which are apertured to receive the pin by means of which the rod is connected to the piston, the construction being such as to admit of the rod being secured to the head preliminary to attaching the body of the piston to the head.

The invention consists of the novel features, details of construction and combination of parts, which hereinafter will be more particularly set forth, illustrated in the accompanying drawing, and pointed out in the appended claims.

Referring to the drawing, forming a part of the specification, Figure 1 is a central longitudinal section of a piston for explosive engines having the connecting rod secured thereto by means embodying the invention. Fig. 2 is a detail view of the head of the piston disconnected from the body, showing a portion of the piston rod attached thereto. Fig. 3 is a sectional view of the body of the piston.

Corresponding and like parts are referred to in the following description, and indicated in all the views of the drawing, by the same reference characters.

The piston comprises a body 1 and head 2. The body 1 is hollow and of cylindrical form and an end portion has its walls thickened, as indicated at 3, said thickened portion being grooved upon the outside to receive the piston rings and having the bore enlarged at its outer end and formed with internal screwthreads 4. The head 2 has an outer flange 5 to overlap the thickened end of the body and has its edge portion formed with screwthreads 6 to match the screwthreads 4 of the body. Ears or webs 7 are formed upon the inner side of the head and are apertured to receive the ends of the pin 8 by means of which the rod 9 is connected to the piston. The ears or webs 7 clear the inner walls of the thickened part 3 of the body and preferably constitute a part of the piston head. The pin 8 is passed through openings formed in the end of the rod 9 and in the parts 7, the ends of the pin coming about flush with the outer sides of the part 7 and said pin being retained in place by the inner walls of the body 1. After the rod 9 has been connected to the head 2 the latter is fitted into the end of the body 1 and secured thereto by means of the matching screwthreads 4 and 6. By having the flange 5 overlap the end of the body 1 the strain incident to the explosion is relieved from the screwthreads, as will be readily understood. Within the purview of the invention the head 2 may be secured within the body 1 in any manner.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A piston comprising a hollow body, a head detachably fitted to and closing the hollow body and having a portion projecting therein, a rod, the projecting portion of the head and the rod having transversely registering openings, and a pin passing through the openings of the head and rod and connecting the latter to the former and adapted to be retained in place by the inner walls of the hollow body.

2. A piston comprising a hollow body having an end portion internally threaded, a head having a portion overlapping an end of the hollow body and having a portion externally threaded to make screwthread connection with the threaded end portion of the hollow body, said head having projecting portions upon its inner side, a rod, and a pin passing through registering openings formed in the rod and projecting portions of the head to connect the rod to the latter, said pin adapted to be held in place by the inner walls of the hollow body.

In testimony whereof I affix my signature in presence of two witnesses.

JOHN BITTNER.

Witnesses:
M. E. FORKNER,
E. J. DUNCAN.